Patented June 9, 1942

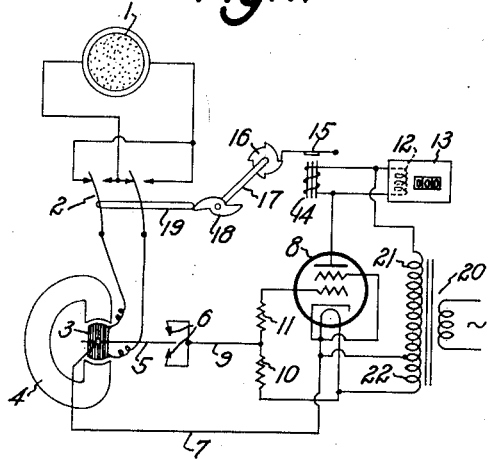
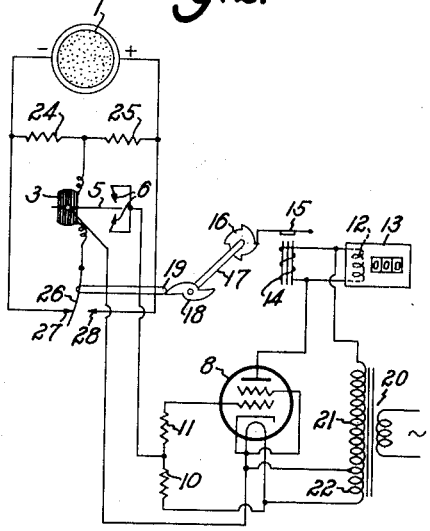
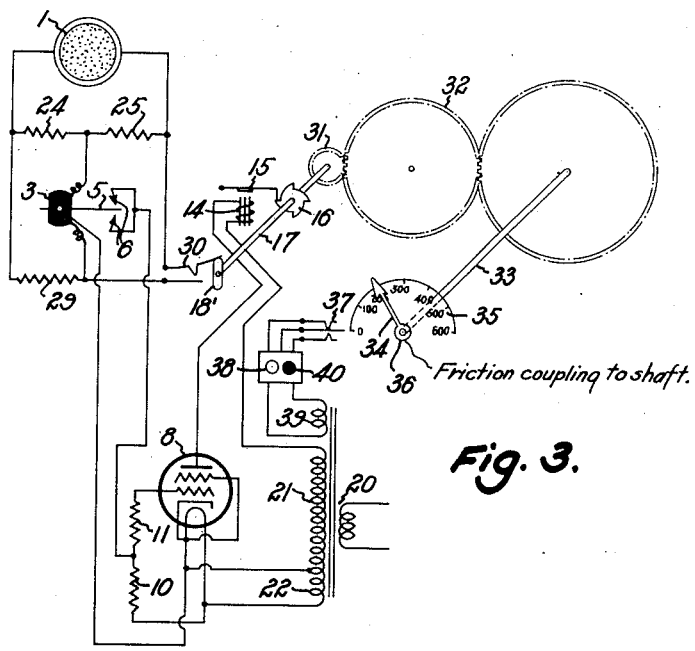

2,286,036

UNITED STATES PATENT OFFICE 2,286,036

INTEGRATING PHOTOMETER

Anthony H. Lamb, Elizabeth, N. J., assignor to Weston Electrical Instrument Corporation, Newark, N. J., a corporation of New Jersey Application January 10, 1940, Serial No. 313,285

13 Claims. (Cl. 171—95)

This invention relates to integrating apparatus and more particularly to apparatus of high sensitivity for integrating against time a variable function that may be measured by an electrical measuring instrument having a sensitivity of the order of a milliammeter or microammeter.

The copending application of Roswell Ward Gilbert, Serial No. 284,805, filed July 15, 1939, now Patent No. 2,239,363, granted April 22, 1941, describes and claims light integrating apparatus including a pivoted coil that oscillates in a magnetic field and, in its alternate end positions, closes relay contacts for the actuation of a counter and of a polarity reversing switch in the leads to the coil. The coil is mounted in jewel bearings and has an angular velocity that varies with the magnitude of the current flowing in the coil, the total travel or number of oscillations of the coil in a given time thus being a measure of the integrated values of the variable function corresponding to the current flow through the coil.

An object of this invention is to provide integrating apparatus of the sensitive oscillating coil type that includes simple and efficient circuits for controlling the indicating and polarity reversing devices of the apparatus. An object is to provide integrating apparatus of the sensitive oscillating coil type that includes a solenoid actuated ratchet device for operating both the polarity reversing switch and the counter, and a relay controlled by the coil displacement to energize the ratchet solenoid. A further object is to provide apparatus of the type last stated in which the relay is of the vacuum tube type. A further object is to provide integrating apparatus including an oscillating coil that displaces a contact arm between a pair of contacts, a polarity reversing network including a single pole switch connecting the coil to a current source, a ratchet mechanism for actuating the switch, and a relay controlled by the contact arm and contacts for advancing the ratchet mechanism. Another object is to provide integrating apparatus including an oscillating coil controlling relay contacts, a circuit energized by said contacts for actuating a ratchet mechanism, and a counter and polarity reversing switch both actuated by the ratchet mechanism. A further object is to provide integrating apparatus of the type last stated in which the counter includes an arcuate scale graduated in values of the integrated quantity, a pivoted pointer movable over the scale and frictionally coupled to a shaft that is driven by the ratchet mechanism, and a signal or control circuit including a switch operated by the pointer when it reaches a predetermined position along the graduated scale.

These and other objects and advantages of the invention will be apparent from the following specification when taken with the accompanying drawing in which:

Figs. 1, 2 and 3 are circuit diagrams of light integrating apparatus embodying the invention.

The invention may be employed for integrating other quantities against time but will be described with respect to the integration of light values as represented by the current output of a photocell of the barrier layer or current-generating type. The current output of such a cell is a substantially linear function of the illumination at the cell, but the generated current is of such a minute order that only instruments of high sensitivity can be operated out of a current-generating photocell. Phototubes can be worked into vacuum tube amplifiers to develop appreciable power for actuating integrating mechanisms but the vacuum tube phototube is not sufficiently stable to insure a reasonable degree of accuracy in operation. The accurate integration of fluctuating illumination values has presented an exceedingly difficult design problem and it is to be understood that the invention may be employed for the integration of factors capable of developing electrical voltages or currents of small absolute values but of an order substantially higher than the currents developed by a current generating photocell.

In Fig. 1 of the drawing, the reference numeral 1 identifies a barrier layer type photocell that is connected through a polarity reversing switch 2 of the conventional double pole, double throw type to a coil 3 that is pivotally mounted in jewel bearings, not shown, for oscillation in the field of a permanent magnet 4. As described in the Gilbert application, the leads to the coil 3 are highly flexible and impose substantially no torque load on the moving system. The coil 3 and magnet 4 resemble a sensitive microammeter but differ from such an instrument in that no torque springs are provided and the coil 3 is displaced freely in the magnet field at a speed that depends upon the current flow through the coil.

The pivoted coil 3 carries a contact arm 5 and displaces the same between spaced contacts 6 that also serve as stops to limit the oscillatory movement of the coil in opposite directions. The contact arm 5 is connected by a lead 7 to the cathode, shield grid and one heater terminal of a hot-cathode gas electrode 8 such as those sold by Radio Corporation of America for grid-controlled rectifier service under the designations types 2050 and 2051. The contacts 6 are joined and connected by a lead 9 to the junction of resistors 10, 11 that may be of the order of 1.5 megohms and serially connected between the inner or control grid and the other heater terminal. The plate circuit of tube 8 includes, in parallel, the solenoid 12 of a counter 13 and the solenoid 14 of a ratchet mechanism comprising the armature 15 and cam 16 on a shaft 17 that carries a cam 18 for shifting the actuating bar 19 of the polarity reversing switch 2. The circuits of tube 8 may be energized in the usual manner from an alternating current source such as a customary 110 volt, 60 cycle power and light circuit through a transformer 20 having a tapped secondary including a winding 21 connected between the plate and cathode of tube 8 and a winding 22 for supplying current to the heater circuit. The sense of the windings 21, 22 and the connections to the heater circuit are such that the control grid is negative with respect to the cathode when the contacts 5, 6 are open and the plate is at a positive potential with respect to the cathode.

The tube 8 does not conduct current under the stated conditions as the negative bias on the control grid blocks conduction. The grid is brought to the same potential as the cathode when the contact arm 5 engages one of the contacts 6, and the tube then passes plate current, on half cycles when the plate potential is positive, to energize the solenoid 12 of the counter and the solenoid 14 of the ratchet mechanism. Shaft 17 of the ratchet mechanism is thereby advanced one step to move cam 18 and plunger 19 to actuate the polarity reversing switch 2. The coil 3 then travels in the opposite direction until the contact arm 5 engages the other contact 6 to supply another current pulse to the solenoids 12 and 14. The coil thus continues to oscillate so long as current is supplied by the photocell and the total travel of the coil is a measure of the integrated light values. The apparatus may be designed to read directly in any desired units, for example foot-candle-seconds, by proper selection of the moving coil constants, and adjustment of the spacing of contacts 6 to determine the angle of oscillation of the coil in accordance with the sensitivity of the photocell.

The integrating apparatus of Fig. 2 differs from the described construction only as to the polarity reversing system, and those elements of the Fig. 2 apparatus that are identical with those of the Fig. 1 circuit are identified by the same reference numerals but will not be described in detail. A pair of resistors 24, 25, preferably of the same magnitude, are connected in series between the leads from the photocell and the coil 3 is connected between the junction of the resistors and the single pole blade 26 that moves between contacts 27, 28 that are connected to the photocell leads.

The direction of current flow through the resistors 24, 25 is not affected by the switch 26—28 but the coil 3 is shunted across first one and then the other resistor as the switch blade 26 is moved from one contact to the other by the plunger 19 and cam 18 of the ratchet mechanism. Inspection of this network will show that the direction of current flow through the coil 3 is reversed by the actuation of the switch blade 26 at each energization of the ratchet mechanism solenoid 14 by an engagement of the coil contact arm 5 with one of the contacts 6. The method of operation is therefore substantially the same as that described above with reference to the Fig. 1 apparatus.

Further simplifications of the electrical and mechanical elements of the apparatus may be effected, as shown in Fig. 3, by a change in the polarity reversing network and the replacement of the separate counter by an indicator geared to the ratchet mechanism shaft. The circuit network connecting the coil 3 to the photocell 1 includes the resistors 24, 25 in series across the photocell 1, and a resistor 29 and single pole, single throw switch 30 in series with each other and connected across the photocell, the coil 3 being connected between the junction of resistors 24, 25 and the junction of resistor 29 and the switch 30. When the switch 30 is open, as shown in Fig. 3, the full photocell current flows through the resistor 25 and then divides to flow, in parallel, through resistor 24 and the coil 3 in series with the resistor 29. A closure of switch 30 through a one-step movement of cam 18' by the ratchet mechanism connects the resistor 29 across the photocell in parallel with a path that includes the resistor 25 and coil 3 in parallel with each other and in series with the resistor 24. The direction of current flow through coil 3 is thus reversed by the closing of the switch 30.

The optimum values of the resistors 24, 25 and 29 will vary with the measuring range, the characteristics of the integrating instrument and the photocell sensitivity, but there may be wide latitude in the selection of the resistance values without materially altering the efficiency or accuracy of the apparatus. The following data is indicative of values that are satisfactory but it is to be understood that the invention is not limited to any particular resistance values or ranges of values. Resistors 24, 25 may each be 100 ohm resistances and resistor 29 may be a 99 ohm resistance when coil 3 has a resistance of 1 ohm and the photocell 1 has a resistance of the order of 3000 ohms. The currents flowing in the parallel paths are equal when the switch 30 is open, and therefore exactly one-half of the total photocell current flows through the coil 3 of the integrating instrument. The current flow is not equally divided in the parallel paths upon closure of switch 30, and the current through coil 3 is approximately 2% below that which takes place when switch 30 is open. The angular velocity of the coil 3 for a given light intensity or total photocell current thus varies slightly with the direction of travel of the coil 3 but this variation does not affect the accuracy of the apparatus as it will be calibrated over a period of time for an average speed that, for the stated resistance values, will be slightly above the actual coil speed in one direction and slightly below the coil speed in the opposite direction.

The indicator of the Fig. 3 apparatus comprises a gear 31 on the ratchet mechanism shaft 17 and meshing with reduction gearing 32 to drive a shaft 33 carrying a pointer 34 that is movable over an arcuate scale 35 graduated in units of integrated light-time values. The hub 36 of the pointer 34 is frictionally coupled to the shaft 33 to permit a manual setting of the pointer 34 to a desired value. The ratchet mechanism rotates the shaft 33 and pointer 34 counterclockwise to return the pointer 34 to zero position when the integrated light value at the photocell 1 reaches the selected value.

A switch 37 may be positioned for actuation by the pointer 34, when it reaches zero position, to actuate a signal or control circuit. As shown in Fig. 3, the switch 37 is a single-pole double throw switch that is normally closed on one contact to energize a signal lamp 38 from a secondary winding 39 of the transformer 20, and is actuated to its alternative position by pointer 34 to close a circuit through a signal device 40 that may be a lamp, a bell or the like.

Each of the described embodiments of the invention is highly stable when operated from the usual power lines that are subject to some voltage fluctuation and the marked reduction in the number of relay elements and switches, as compared with the electromagnet relay circuits of the Gilbert application, results in reduced initial and maintenance costs. There is latitude in the design of the grid-controlled relay tubes and in the tube circuits, and it is to be understood that various modifications that may occur to those familiar with the art fall within the spirit of my invention as set forth in the following claims.

I claim:

1. In an integrating photometer, the combination with an integrating system comprising means establishing a magnetic field, a coil mounted for free oscillation in the magnetic field, a contact arm carried by said coil, and relatively fixed contacts spaced from each other along the path of said contact and electrically connected to each other, of a photoelectric cell of the current-generating type, circuit elements including a polarity reversing switch connecting said photocell to said coil, means including a solenoid for actuating said polarity reversing switch, a vacuum tube having said solenoid in the output circuit thereof, and a circuit including said contact arm and contacts for controlling conduction through said tube.

2. In an integrating apparatus, the invention as claimed in claim 1, wherein said means for actuating said polarity reversing switch includes a ratchet mechanism operated by said solenoid.

3. In an integrating apparatus, the invention as claimed in claim 1, wherein said means for actuating said polarity reversing switch includes a ratchet mechanism operated by said solenoid, in combination with means actuated by said ratchet mechanism for registering the oscillations of said coil.

4. In integrating apparatus, means establishing a magnetic field, a coil mounted for oscillation in the magnetic field, circuit elements for supplying to said coil a current that varies in magnitude with a factor to be integrated, said circuit elements including a switch for reversing the polarity of the current supplied to said coil, a relay circuit including relatively fixed contacts and a contact arm carried by said coil, means for actuating said polarity reversing switch, means for registering the oscillations of said coil, and ratchet mechanism energized by said relay circuit for operating both of said means.

5. Integrating apparatus of the type including an oscillating coil connected to a variable direct current source through a polarity reversing switch, characterized by the fact that a pair of resistors are serially connected across said current source, said switch is of the single pole type and said coil is connected between the junction of said resistors and a contact of the switch.

6. Integrating apparatus as claimed in claim 5, wherein said switch has a contact movable between a pair of spaced contacts connected to opposite terminals of said current source, and said coil is connected to the movable switch contact.

7. Integrating apparatus as claimed in claim 5, wherein said switch contact is connected through a resistor to one terminal of said current source, and the cooperating switch contact is connected to the other terminal of said current source.

8. In integrating apparatus, a current generating photocell, means for establishing a magnetic field, a coil pivotally mounted for oscillation in said magnetic field, circuit elements including a polarity reversing switch connecting said coil to said photocell, relay contacts including a contact arm carried by said coil and spaced relatively fixed contacts, a solenoid-operated ratchet mechanism for actuating said polarity reversing switch, and a relay circuit including said contact arm and contacts for energizing said ratchet mechanism.

9. In integrating apparatus, the invention as claimed in claim 8, in combination with means energized by said relay circuit for registering the oscillations of said coil.

10. In integrating apparatus, the invention as claimed in claim 8, in combination with means actuated by said ratchet mechanism for registering the oscillations of said coil.

11. In integrating apparatus, the combination with means establishing a magnetic field, a coil mounted for oscillation in the magnetic field, a current source connected across said coil for supplying thereto a current that varies with a factor to be integrated, and means for reversing the direction of current flow through said coil to effect oscillation thereof in repeated cycles of movement of predetermined extent, of means for registering the number of oscillations of said coil; said registering means including a relay circuit having contacts closed by said coil at its end positions, a shaft and means energized by said relay circuit for imparting a step-by-step rotation to said shaft, a pointer carried by said shaft, and a graduated scale cooperating with said pointer.

12. In integrating apparatus, the invention as set forth in claim 11, wherein said pointer is frictionally connected to said shaft, and said means energized by said relay circuit displaces said pointer towards the zero graduation of said scale, whereby said pointer may be manually set at a desired value on said graduated scale and then returned to zero position upon a time integration of the factor to the desired value at which the pointer was manually set.

13. In integrating apparatus, the invention as set forth in claim 11, wherein said pointer is frictionally connected to said shaft, and said means energized by said relay circuit displaces said pointer towards the zero graduation of said scale, whereby said pointer may be manually set at a desired value on said graduated scale and then returned to zero position upon a time integration of the factor to the desired value at which the pointer was manually set, in combination with a circuit including a switch having a movable contact positioned for actuation by said pointer upon arrival at zero position on said scale.

ANTHONY H. LAMB.